US012625679B2

(12) United States Patent
Wei

(10) Patent No.: US 12,625,679 B2
(45) Date of Patent: May 12, 2026

(54) METHOD AND APPARATUS FOR GENERATING RANDOM SEQUENCES, AND DEVICE AND MEDIUM THEREOF

(71) Applicants: Beijing BOE Technology Development Co., Ltd., Beijing (CN); BOE Technology Group Co., Ltd., Beijing (CN)

(72) Inventor: Xiangye Wei, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 217 days.

(21) Appl. No.: 17/780,280

(22) PCT Filed: Jun. 25, 2021

(86) PCT No.: PCT/CN2021/102482
§ 371 (c)(1),
(2) Date: May 26, 2022

(87) PCT Pub. No.: WO2022/267038
PCT Pub. Date: Dec. 29, 2022

(65) Prior Publication Data
US 2024/0160409 A1 May 16, 2024

(51) Int. Cl.
*G06F 7/58* (2006.01)

(52) U.S. Cl.
CPC .............. *G06F 7/58* (2013.01); *G06F 7/586* (2013.01)

(58) Field of Classification Search
CPC . G06F 7/58; G06F 7/588; G06F 7/586; G06F 7/582
See application file for complete search history.

(56) References Cited

U.S. PATENT DOCUMENTS

| | | | |
|---|---|---|---|
| 2014/0019502 A1* | 1/2014 | Goettfert | G06F 7/58 708/250 |
| 2016/0210226 A1* | 7/2016 | Hall | G06F 11/3692 |
| 2019/0004926 A1* | 1/2019 | Bangalore Krishnamurthy | G06F 11/3672 |

OTHER PUBLICATIONS

Satish, N. R., & Yi, Y. (2020). Finite State Machine. Our Pattern Language. https://patterns.eecs.berkeley.edu/?page_id=470 (Year: 2020).*

* cited by examiner

*Primary Examiner* — Emily E Larocque
*Assistant Examiner* — Jerome Anthony Klosterman, II
(74) *Attorney, Agent, or Firm* — IPro, PLLC

(57) ABSTRACT

Provided is a method for generating random sequences. The method is applicable to generating a random sequence using a plurality of state machines, any state machine of which is configured to generate an output value. The method includes: selecting, in accordance with a first rule, a state machine from the state machines successively to output a value according to history output values of at least a portion of the state machines; acquiring an output value of each of the state machines; and forming a random sequence from the output values of the state machines according to an output order of the state machines.

17 Claims, 13 Drawing Sheets

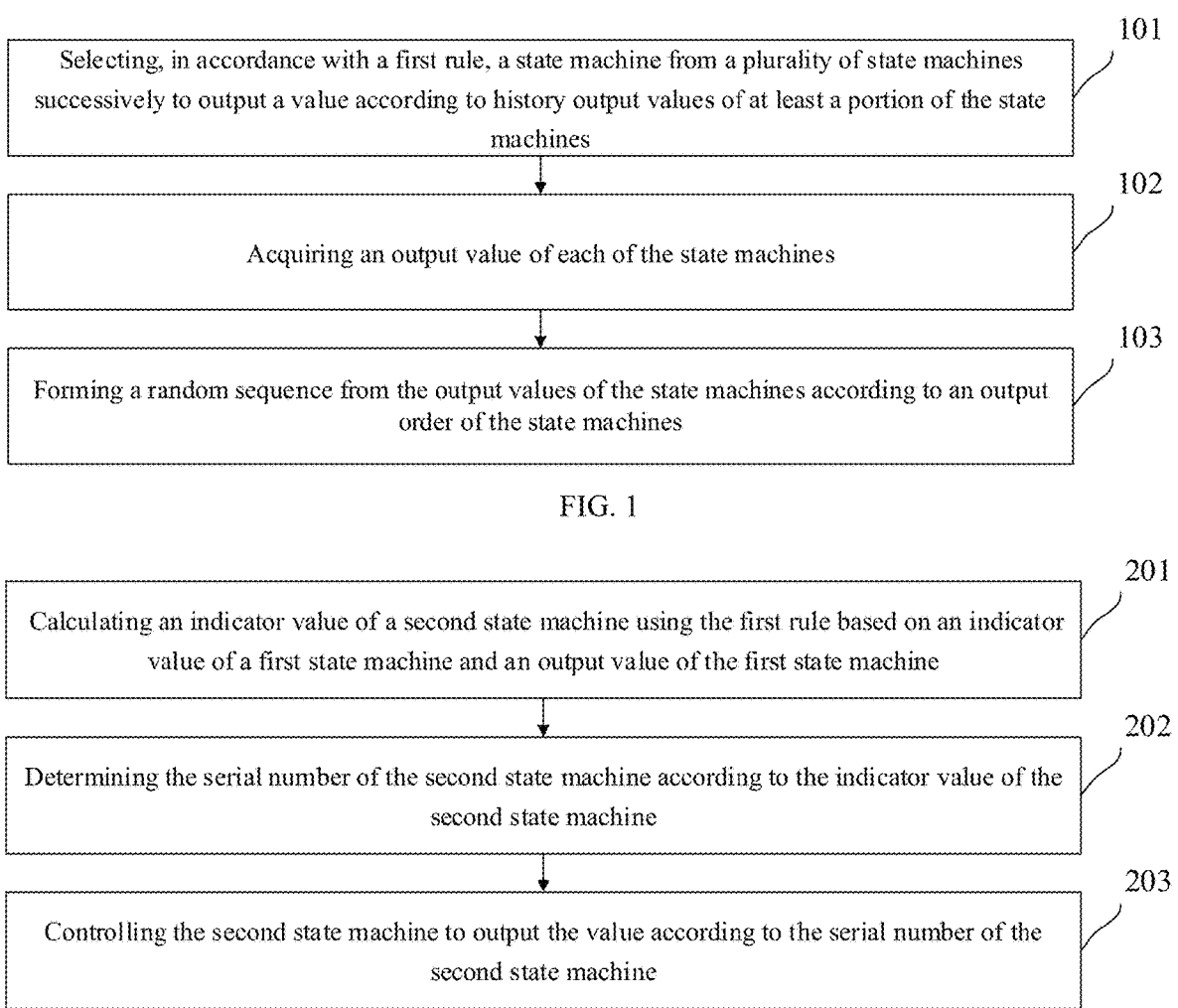

101

Selecting, in accordance with a first rule, a state machine from a plurality of state machines successively to output a value according to history output values of at least a portion of the state machines

102

Acquiring an output value of each of the state machines

103

Forming a random sequence from the output values of the state machines according to an output order of the state machines

Calculating an indicator value of a second state machine using the first rule based on an indicator value of a first state machine and an output value of the first state machine

202

Determining the serial number of the second state machine according to the indicator value of the second state machine

203

Controlling the second state machine to output the value according to the serial number of the second state machine

2011 performing a Mod K operation on a sum of three portions, wherein the three portions include an indicator value of a first state machine, a product of an output value of the first state machine and a first parameter value, and a second parameter value

FIG. 23

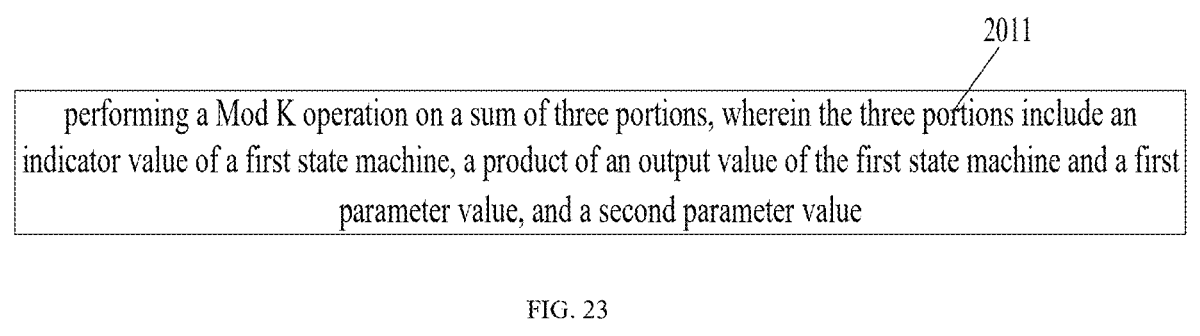

METHOD AND APPARATUS FOR GENERATING RANDOM SEQUENCES, AND DEVICE AND MEDIUM THEREOF

CROSS-REFERENCE TO RELATED APPLICATION

The present disclosure is a U.S. national stage of international application No. PCT/CN2021/102482, filed on Jun. 25, 2021, the content of which is incorporated herein by reference in its entirety.

TECHNICAL FIELD

The present disclosure refers to a method and apparatus for generating random sequences, and a device and a medium thereof.

BACKGROUND ART

Random sequences may be applied in the field of information encryption or the like.

In the related art, a random sequence may be generated using a plurality of state machines. Each of the state machines may output 0 or 1 randomly, and the state machines output values in a fixed order. The output values of the state machines constitute the random sequence.

SUMMARY

Embodiments of the present disclosure provide a method and apparatus for generating random sequences, and a device and a medium thereof.

In a first aspect, the embodiments of the present disclosure provide a method of random sequence generation. The method is applicable to generating a random sequence using a plurality of state machines, wherein any of the state machines is configured to generate an output value. The method includes: selecting, in accordance with a first rule, a state machine from the state machines successively to output a value according to history output values of at least a portion of the state machines; acquiring an output value of each of the state machines; and forming a random sequence from the output values of the state machines according to an output order of the state machines.

In one implementation of the embodiments of the present disclosure, a serial number is assigned to each of the state machines, and the serial numbers of the state machines are integer and consecutive numbers. The first rule is configured to calculate an indicator value of a second state machine according to an indicator value of a first state machine and an output value of a first state machine. The second state machine is a next one of the state machines which outputs a value following the first state machine.

In one implementation of the embodiments of the present disclosure, selecting, in accordance with the first rule, the state machine from the state machines successively to output the value according to history output values of the at least the portion of the state machines includes: calculating the indicator value of the second state machine using the first rule based on the indicator value of the first state machine and the output value of the first state machine; determining a number of the second state machine based on the indicator value of the second state machine; controlling the second state machine to output the value according to the serial number of the second state machine.

In one implementation of the embodiments of the present disclosure, calculating the indicator value of the second state machine using the first rule based on the indicator value of the first state machine and the output value of the first state machine includes: acquiring the indicator value of the second state machine by performing a Mod K operation on a sum of the indicator value of the first state machine, the product of the output value of the first state machine and a first parameter value, and a second parameter value. K represents a quantity of the state machines, the first parameter value is greater than 0 and less than 1, the second parameter value is an integer, and the second parameter value ranges within $[2, 2K-1]$.

In one implementation of the embodiments of the present disclosure, determining the serial number of the second state machine based on the indicator value of the second state machine, includes: assigning an integer portion of the indicator value of the second state machine as the serial number of the second state machine.

In one implementation of the embodiments of the present disclosure, the method further includes controlling the state machines to stop outputting values when a boundary condition is satisfied. The boundary condition includes: one history indicator value in a set of history indicator values being equal to an indicator value of the state machine currently outputting the value.

In one implementation of the embodiments of the present disclosure, the quantity of the state machines is $2^t$, wherein t is a positive integer In one implementation of the embodiments of the present disclosure, each of the state machines randomly selects one of a first value and a second value as the output value to output the value at a first output.

In a second aspect, the embodiments of the present disclosure provide an apparatus for generating random sequences. The apparatus includes: a state module, a selecting module, an acquiring module, and a generating module. The state module includes a plurality of state machines, wherein any state machine of the state machines is configured to generate an output value. The selecting module is configured to select, in accordance with a first rule, a state machine from the state machines successively to output a value according to history output values of at least a portion of the state machines. The acquiring module is configured to acquire an output value of each of the state machines. The generating module is configured to form a random sequence from the output values of the state machines according to an output order of the state machine.

In one implementation of the embodiments of the present disclosure, a serial number is assigned to each of the state machines, the serial numbers of the state machines being integer and consecutive numbers. The selecting module includes a calculating sub-module, a determining sub-module, and a control sub-module. The calculating sub-module is configured to calculate an indicator value of a second state machine according to an indicator value of the first state machine, an output value of the first state machine, wherein the second state machine is a next one of the state machines which outputs a value following the first state machine. The determining sub-module is configured to determine a number of the second state machine based on the indicator value of the second state machine. The control sub-module is configured to control the second state machine to output the value according to the serial number of the second state machine.

In one implementation of the embodiments of the present disclosure, the calculating sub-module is configured to acquire the indicator value of the second state machine by performing a Mod K operation on a sum of the indicator value of the first state machine, the product of the output value of the first state machine and a first parameter value, and a second parameter value. K represents a quantity of the state machines, the first parameter value is greater than 0 and less than 1, the second parameter value is an integer, and the second parameter value ranges within [2, 2K−1].

In one implementation of embodiments of the present disclosure, the determining sub-module is configured to assign an integer portion of the indicator value of the second state machine as the serial number of the second state machine.

In one implementation of embodiments of the present disclosure, the apparatus further includes a stopping module, configured to control the state machines to stop outputting values when a boundary condition is satisfied. The boundary condition includes: one history indicator value in a set of the history indicator values being equal to an indicator value of the state machine currently outputting the value.

In one implementation of the embodiments of the present disclosure, the quantity of the state machines is $2^t$, wherein t is a positive integer.

In one implementation of embodiments of the present disclosure, each of the state machines randomly selects one of a first value and a second value as the output value to output the value at a first output.

In a third aspect, the embodiments of the present disclosure provide a computer device. The computer device includes a processor, and a memory configured to store computer programs, wherein the processor is configured to perform, when executing the computer programs stored in the memory, the method described above.

In a fourth aspect, the embodiments of the present disclosure provide a computer-readable storage medium storing computer instructions, wherein the computer instructions, when executed by a processor, cause the processor to perform the method described above.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic diagram of a method for generating random sequences according to an embodiment of the present disclosure;

FIG. 2 is a flowchart of a method for controlling an output of a state machine according to an embodiment of the present disclosure;

FIG. 23 shows a step 2011 about how to obtain an indicator value of a second state machine.

DETAILED DESCRIPTION

Figures 3, 4:
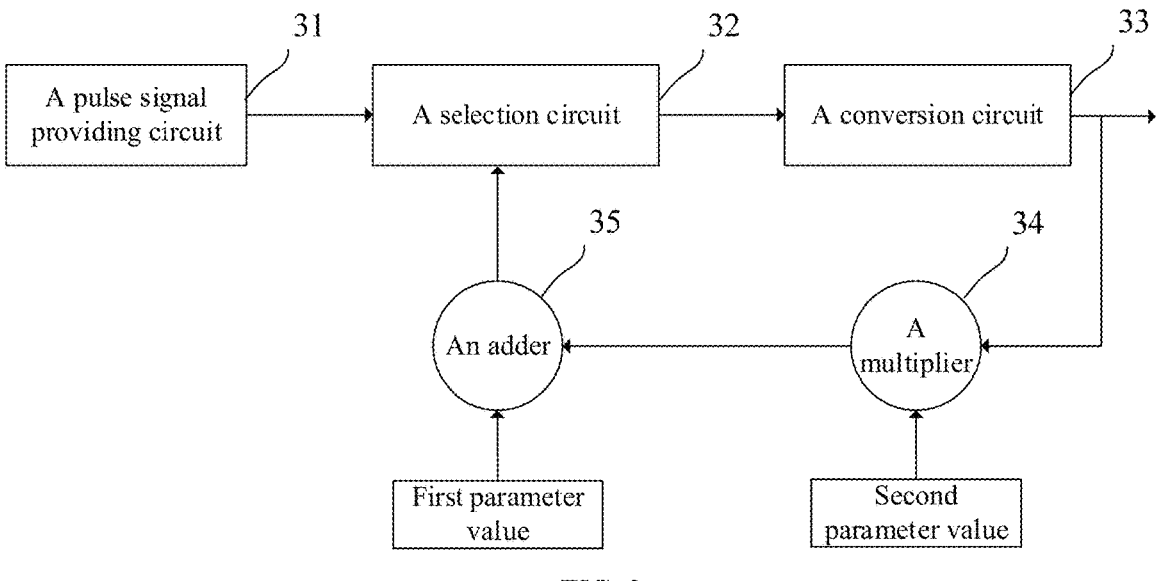
FIG. 3 is a circuit diagram of a method for controlling an output of a state machine according to an embodiment of the present disclosure.
FIG. 4 is a schematic diagram of a method for selecting a state machine according to an embodiment of the present disclosure.
Figure 5:
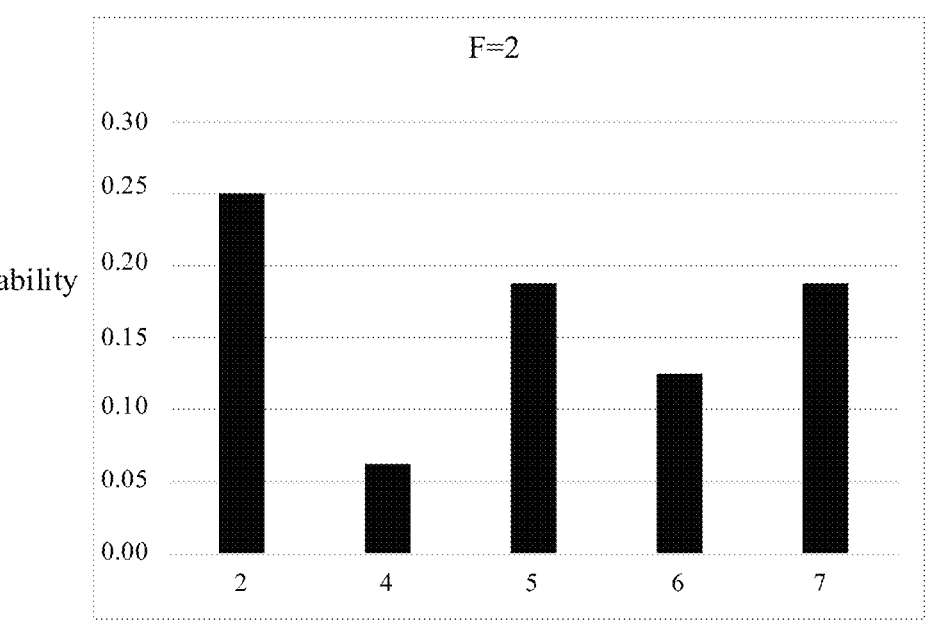
FIGS. 5 to 10 are schematic diagrams of probability density distributions of N under different F of one example according to an embodiment of the present disclosure.
Figure 6:
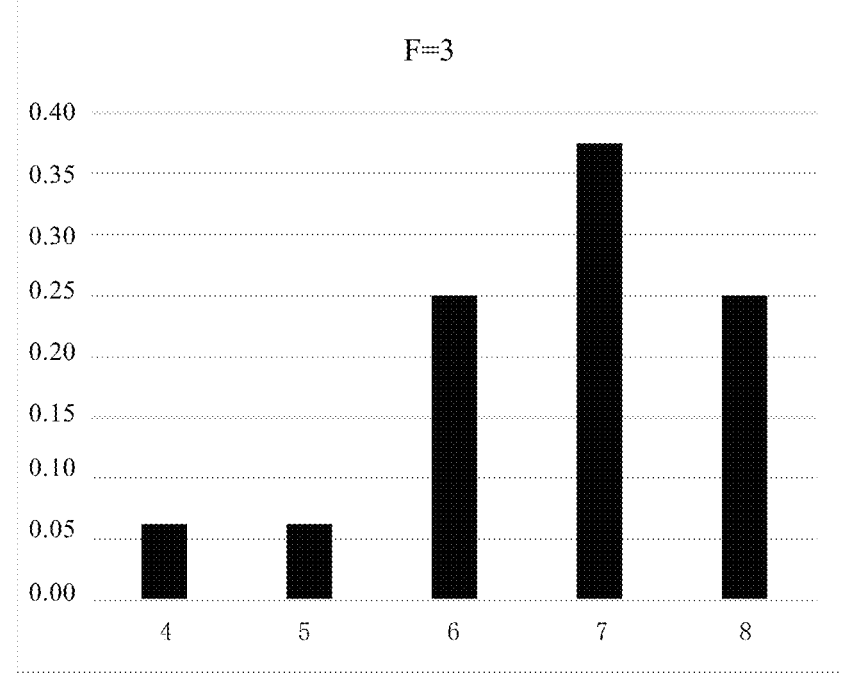
Figure 7:
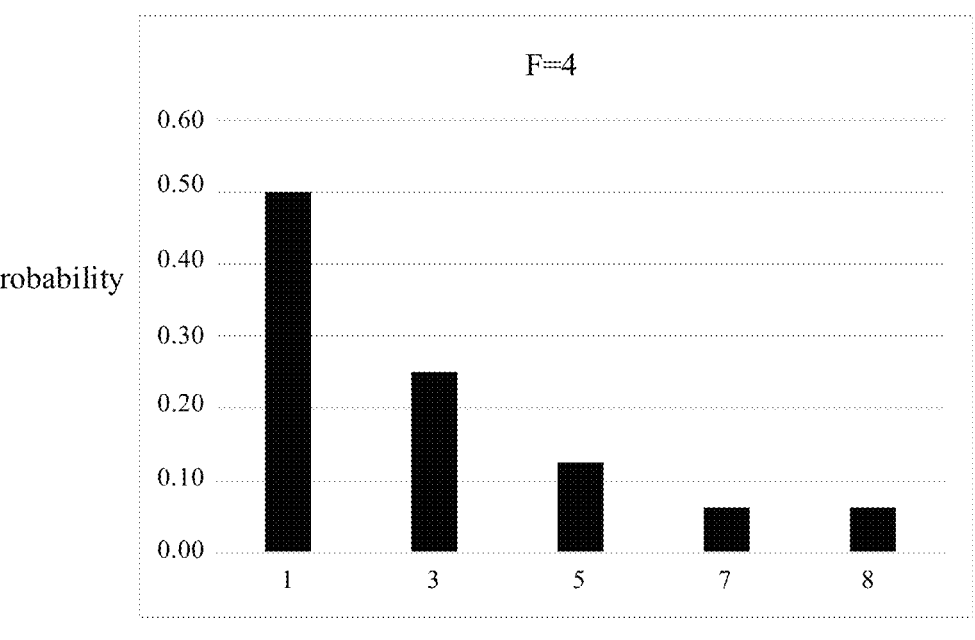
Figure 8:
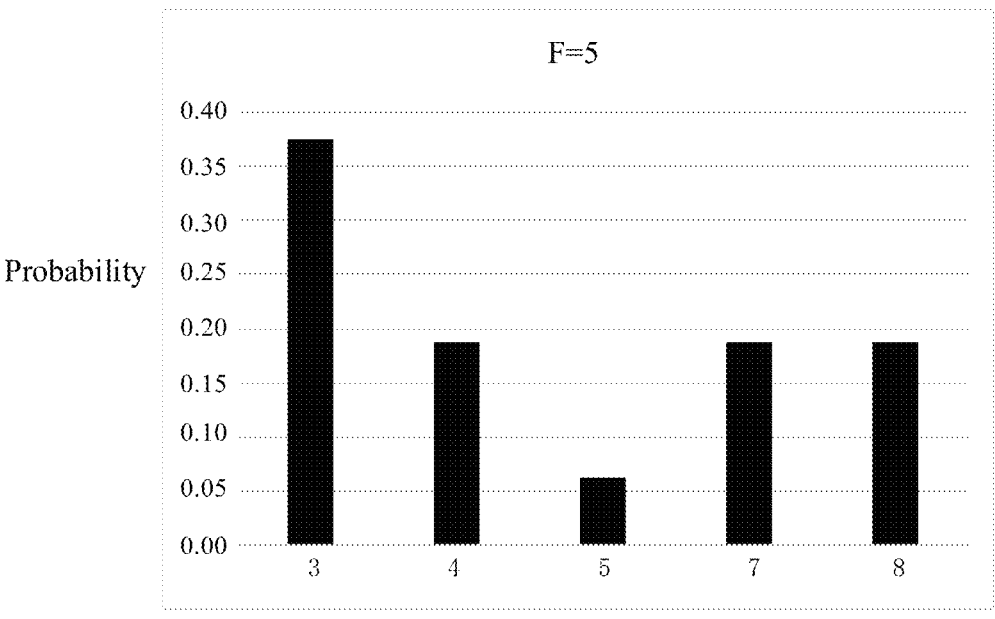
Figure 9:
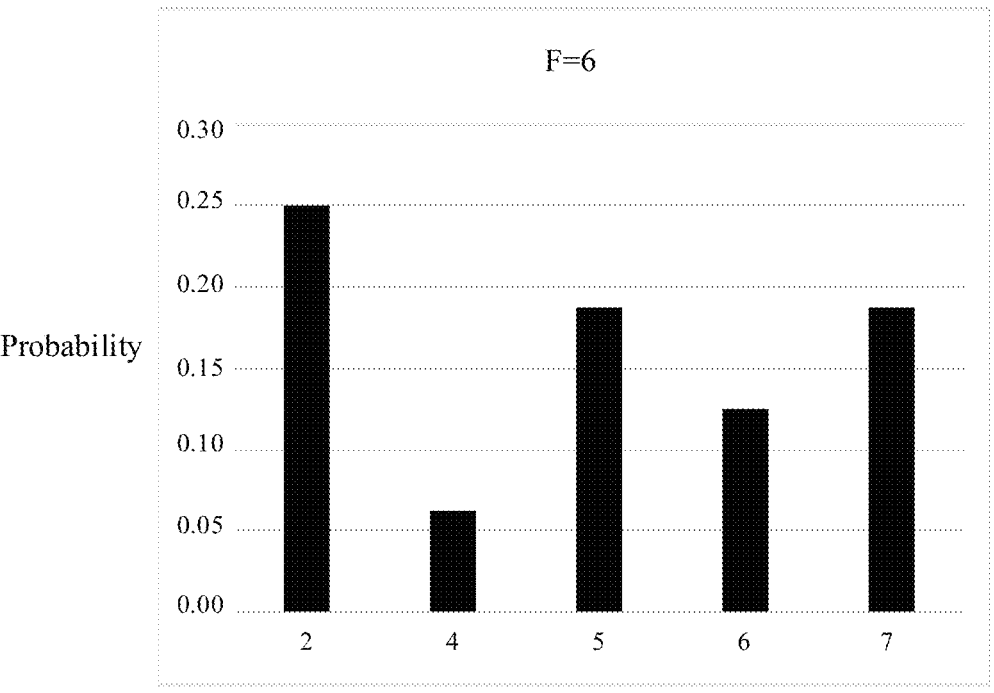
Figure 10:
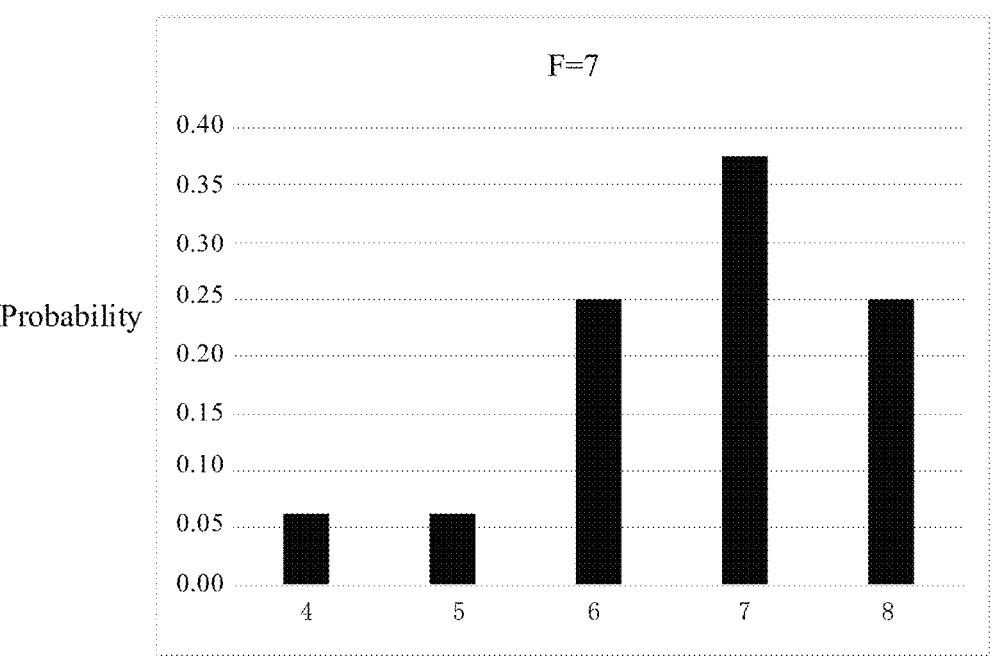
Figure 11:
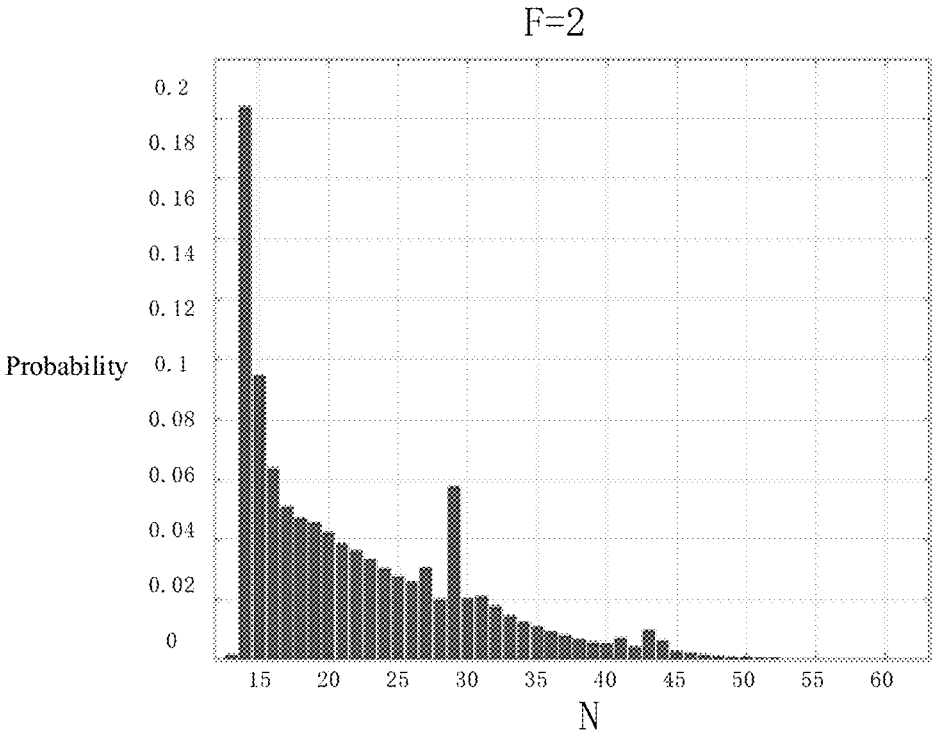
FIGS. 11 to 16 are schematic diagrams of probability density distributions of N under different F of another example according to an embodiment of the present disclosure.
Figure 12:
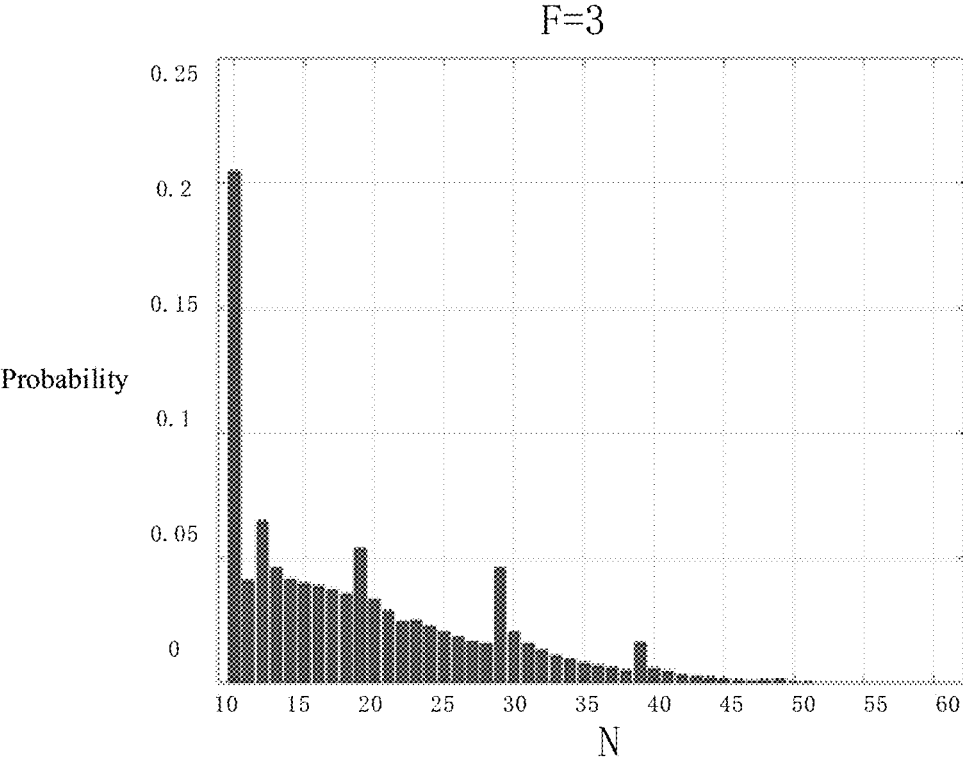
Figure 13:
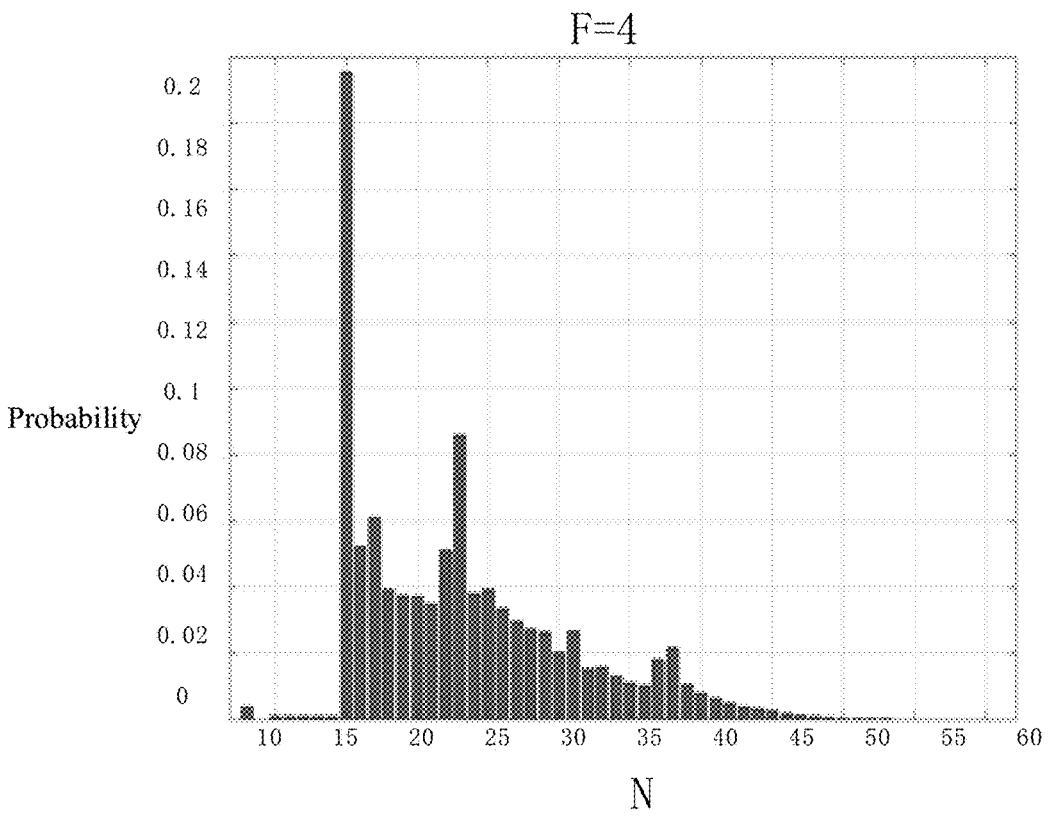
Figure 14:
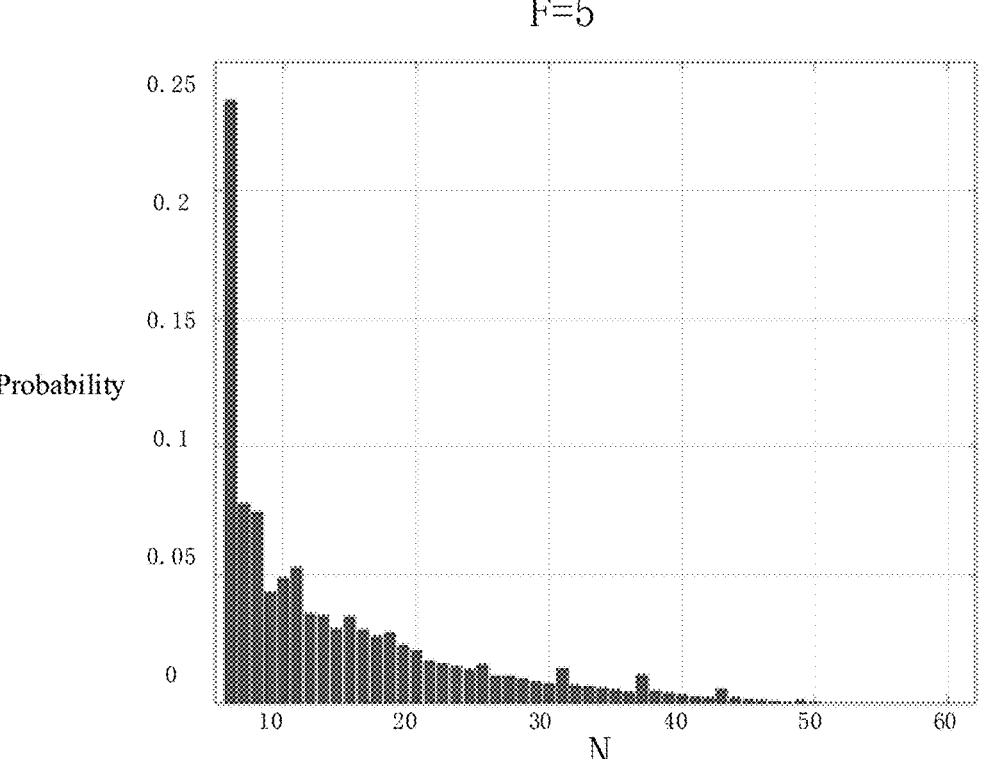
Figure 15:
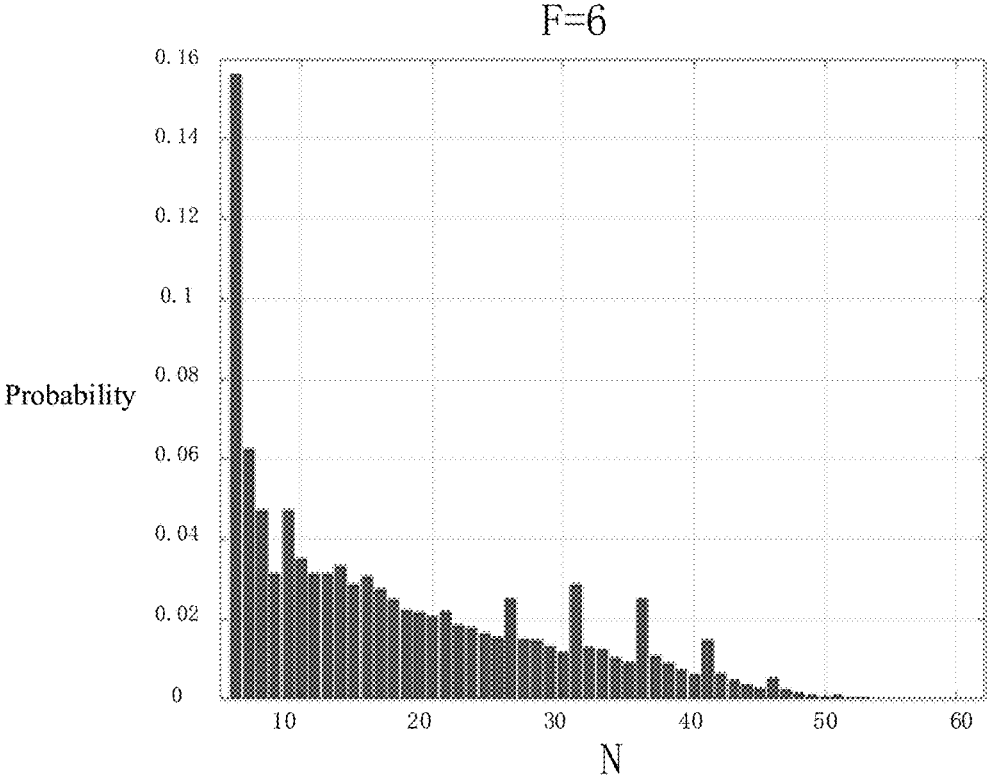
Figure 16:
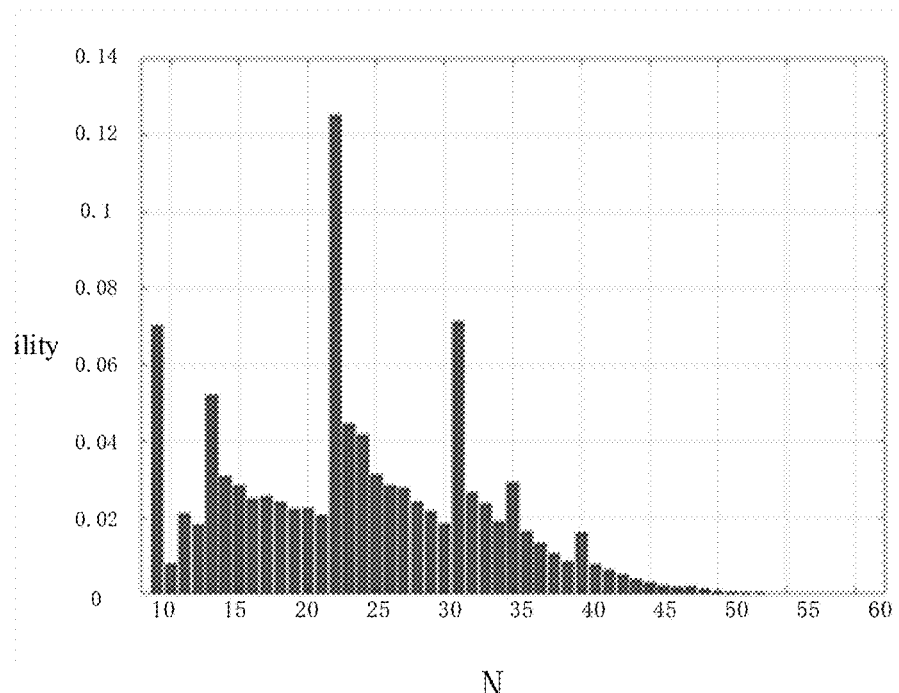

For clearer descriptions of the objectives, technical solutions, and advantages of the present disclosure, embodiments of the present disclosure are described in detail hereinafter with reference to the accompanying drawings.

Embodiments of the present disclosure provide a method for generating random sequences, which is applied to the field of information encryption, fingerprinting, security protection, and the like. In the embodiments of the present disclosure, the random sequence is also known as a time series.

FIG. 1 is a schematic diagram of a method generating random sequences according to an embodiment of the present disclosure. As shown in FIG. 1, the method includes the following steps.

In step 101, a state machine is selected, in accordance with a first rule, from a plurality of state machines successively to output a value according to history output values of at least a portion of the state machines.

Each of the state machines is configured to generate an output value, e. g., 0 or 1.

Illustratively, a serial number is assigned to each of the state machines, e. g., the serial numbers of the plurality of state machines are integer and consecutive numbers, such as 0, 1, . . . and N.

In step 102, an output value of each of the state machines is acquired.

That is, the output value of each of the state machines successively selected in step 101 is acquired.

In step 103, a random sequence is formed by grouping the output values of the state machines according to an output order of the state machines.

According to the history output values of at least a portion of a plurality of state machines, a state machine is selected, in accordance the first rule, from the state machines successively; and since the selection of each of the state machines is related to the history outputs of the state machine, the state machines which output the values are more random, such that the random sequence including the output values of the state machines is also more random and more difficult to predict, improving the security of information encryption using the random sequence.

FIG. 2 is a flowchart of a method for controlling an output of a state machine according to an embodiment of the present disclosure. As shown in FIG. 2, a process of selecting the state machine includes the following steps.

In step 201, an indicator value of a second state machine is calculated in accordance with the first rule based on an indicator value of a first state machine and an output value of the first state machine.

Illustratively, the first rule is configured to calculate the indicator value of the second state machine according to the indicator value of the first state machine, the output value of the first state machine. The second state machine is a next one of the state machines which outputs a value following the first state machine.

The indicator value for each of the state machines calculated based on the first rule is not only related to outputs of a previous state machine, but also to the indicator value of the previous state machine, which increases the randomness and complexity of the state machine selection, thereby increasing the randomness and complexity of the generated random sequence.

In the embodiments of the present disclosure, the second state machine is relative to the first state machine, and each of the state machines may serve as a second state machine for the other state machine. For example, the state machines are in an output order of a state machine 1, a state machine 4, and a state machine 2. When the state machine 1 is the first state machine, the second state machine is the state machine 4; and when the state machine 4 is the first state machine, the second state machine is the state machine 2.

In one possible example, step 201 includes: acquiring the indicator value of the second state machine by performing a Mod K operation on a sum of the indicator value of the first state machine, a product of the output value of the first state machine and a first parameter value, and a second parameter value. K represents a quantity of the state machines, the first parameter value is greater than 0 and less than 1, the second parameter value is an integer, and the second parameter value ranges within [2, 2K−1].

By setting different first parameter values and second parameter values, a different sequence of indicator values may be acquired, thereby controlling the state machines to output the values in a different order, further increasing the randomness and complexity of the generated random sequence.

In some embodiments, the quantity of the state machines is $2^t$, wherein t is a positive integer. In other embodiments, the quantity of the state machines may be any positive integer.

In the embodiments of the present disclosure, each of the state machines randomly selects one of the first value and the second value as the output value that is output during value outputting for the first time, and then the output value of each of the state machines is unchanged throughout the generation of the random sequence. For example, the output value of the state machine 3 is the first value in the first output, and the output value of the state machine 3 is still the first value when the value is again output by the state machine 3, in the subsequent value outputting of the state machines.

Illustratively, in the binary, the first value and the second value are 0 and 1, respectively. The probability that each of the state machines outputs 0 or 1 is 0.5, which satisfies the Bernoulli distribution.

The calculation of the indicator value of the second state machine will be described in detail below according to Equation (1).

$$A(n) = (A(n-1) + O_{\lfloor A(n-1) \rfloor} * r + F)(\bmod\ K) \qquad (1)$$

In Equation (1), A(n) represents an indicator value of the $n^{th}+1$ state machine outputting the value; A(n−1) represents an indicator value of the $n^{th}$ state machine outputting the value, that is, A(n−1) represents an indicator value of the first state machine, and A(n) represents an indicator value of the second state machine; A(0) represents an indicator value of the $1^{th}$ state machine, which means that A(0) is an initial value and can be set as required, and for example, A(0) is an integer ranging within [0, K−1]; $O_{\lfloor A(n-1) \rfloor}$ represents the output value of the $n^{th}$ state machine, wherein the output value of each of the state machines is 0 or 1, and the probability that each of the state machines outputs 0 or 1 is 0.5; r represents the first parameter value; K represents the quantity of the state machines; F represents the second parameter value, and F ranges within [2, 2K−1]; and mod K represents the Mod K operation. In embodiments of the present disclosure, both the first parameter value and the second parameter value may be set as required.

Since r is a decimal number, and F may also be a decimal number, the calculated A(n) may be either an integer or a decimal number. That is, the indicator value of each of the state machines may be an integer, or a decimal number.

FIG. 3 is a circuit diagram of a method for controlling an output of a state machine according to an embodiment of the present disclosure. As shown in FIG. 3, the circuit includes a pulse signal providing circuit 31, a selection circuit 32, a conversion circuit 33, a multiplier 34, and an adder 35. The pulse signal providing circuit 31 is configured to provide a plurality of pulse signals, e. g., two pulse signals, for the state machines, separately. The selection circuit 32 is configured to select one of the pulse signals corresponding to the selected state machine for output based on the indicator value of the state machine. The conversion circuit 33 is configured to convert the output pulse signal into an output value. The multiplier 34 is configured to multiply the output value output by the conversion circuit 33 with the second parameter value. The adder 35 is configured to output the sum of the first parameter value and the product of the output value output by the conversion circuit 33 and the second parameter value to the selection circuit 32, and to accumulate with the indicator value (i.e., the indicator value of the first state machine), saved in the selection circuit 32, of the state machine previously outputting the value, in order to acquire an indicator value of the new state machine, i.e., the indicator value of the second state machine.

Optionally, the selection circuit 32 may be a time-average-frequency direct-period synthesizer circuit.

In another possible implementation, step 201 includes: acquiring the indicator value of the second state machine by performing a Mod K operation on a sum of the indicator value of the first state machine, an accumulated value of products of history output values of the first state machine and the first parameter value separately, and the second parameter values.

K represents the quantity of a plurality of state machines, the first parameter value is greater than 0 and less than 1, the second parameter value is an integer, and the second parameter value ranges within [2, 2K−1].

Illustratively, the indicator value of the second state machine is calculated using the following equation (2):

$$A(n) = \left( A(n-1) + \sum_{i=1}^{n} O_{\lfloor A(n-i) \rfloor} \cdot r_i + F \right) (\bmod\ K) \qquad (2)$$

In equation (2), A(n) represents an indicator value of the $(n+1)^{th}$ state machine outputting the value; A(n−1) represents an indicator value of the $n^{th}$ state machine outputting the value, that is, A(n−1) represents an indicator value of the first state machine, and A(n) represents an indicator value of the second state machine; A(0) represents an initial value, which can be set as required, and for example, A(0) represents an integer ranging within [0, K−1];

$$\sum_{i=1}^{n} O_{\lfloor A(n-i) \rfloor}$$

represents the accumulated value of the output values of the previous n state machines which, the output value of each of the state machines is 0 or 1, and the probability that each of the state machines outputs 0 or 1 is 0.5; $r_i$ represents the first parameter value, and $r_1 = r_2 = \ldots r_n$; K represents the quantity of the state machines; F represents the second parameter value, and F ranges within [2, 2K−1]; and mod K represents the Mod K operation.

In some embodiments of the present disclosure, both the first parameter value and the second parameter value may be set as required.

Because $r_i$ is a decimal number, and F may also be a decimal number, the calculated A(n) may be either an integer or a decimal number. That is, the indicator value of each of the state machines may be an integer, or a decimal number In step 202, the serial number of the second state machine is determined according to the indicator value of the second state machine.

Illustratively, the integer part of the indicator value of the second state machine is assigned as the serial number of the second state machine. For example, if the indicator value of the second state machine is 4.5, indicating that the integer portion of the value is 4, then the second state machine is the state machine 4.

In step 203, the second state machine is controlled to output a value according to the serial number of the second state machine.

Based on the method similar to steps 201 to 203, the third state machine may be controlled, based on the indicator value and the output value of the second state machine, to output the value. Further, the outputs of the fourth state machine, the fifth state machine, and the $N^{th}$ state machine, may be acquired.

Optionally, the method further includes: when a boundary condition is satisfied, controlling the state machines to stop outputting values when a boundary condition is satisfied. The boundary condition may be that one history indicator value in a set of the history indicator values is equal to a currently output indicator value of the state machine.

For example, the state machine currently outputting the value is the $(N+1)^{th}$ state machine, and in the case that an indicator value of the $(M+1)^{th}$ state machine is equal to the indicator value of the $(N+1)^{th}$ state machine, in combination with Equation (1), i.e., A(M)=A(N), wherein M is a positive integer less than N, the $(N+2)^{th}$ state machine is no longer controlled to output the value. At this time, the output values of the first state machine, the second state machine . . . , the $(N+1)^{th}$ state machine constitute a random sequence of N+1 bits.

FIG. 4 is a schematic diagram of a method for selecting a state machine according to an embodiment of the present disclosure. As shown in FIG. 4, assuming that there are four state machines S(1), S(2), S(3), and S(4), corresponding to four outputs 0, 1, 1, and 0. The aforementioned sequence according to Equation (1) and the boundary condition is 00101001. The 4-bit sequence becomes an 8-bit sequence.

Accordingly, the method for generating random sequences according to the embodiments of the present disclosure may increase the randomness of the state machine output, thereby increasing the length and complexity of the random sequence generated, and thus making the generated random sequence unpredictable The effects of the embodiments of the present disclosure are described as follows in Equation (1) and the boundary condition.

First Example

The parameter settings are as follows:

A(0)=0, K=4, r=0.5, i.e., the indicator value of the first state machine is 0, and four state machines are employed to output values. When the boundary condition is satisfied, N takes the corresponding value. That is, the state machine currently outputting the value is the $(N+1)^{th}$ state machine, and the length of the generated random sequence is N+1. F takes a different value; the results are listed in Table 1.

TABLE 1

| | K = 4, r = 0.5 | | |
| --- | --- | --- | --- |
| F | N | Probabilities | E(N) |
| 2 | 2 | 1/4 | 5.25 |
| | 4 | 1/16 | |
| | 5 | 3/16 | |
| | 6 | 1/8 | |
| | 7 | 3/16 | |
| | 8 | 3/16 | |
| 3 | 4 | 1/16 | 6.6875 |
| | 5 | 1/16 | |
| | 6 | 1/4 | |
| | 7 | 3/8 | |
| | 8 | 1/4 | |
| 4 | 1 | 1/2 | 2.8125 |
| | 3 | 1/4 | |
| | 5 | 1/8 | |
| | 7 | 1/16 | |
| | 8 | 1/16 | |
| 5 | 3 | 3/8 | 5 |
| | 4 | 3/16 | |
| | 5 | 1/16 | |
| | 7 | 3/16 | |
| | 8 | 3/16 | |
| 6 | 2 | 1/4 | 5.25 |
| | 4 | 1/16 | |
| | 5 | 3/16 | |
| | 6 | 1/8 | |
| | 7 | 3/16 | |
| | 8 | 3/16 | |
| 7 | 4 | 1/16 | 6.6875 |
| | 5 | 1/16 | |
| | 6 | 1/4 | |
| | 7 | 3/8 | |
| | 8 | 1/4 | |
| F ∈ {2, 3, 4, 5, 6, 7} | | 1 | 5.28125 |

FIGS. 5 to 10 are schematic diagrams of probability density distributions of N under different F of one example according to an embodiment of the present disclosure. In Table 1, the greater the expected value E (N) of N, the greater the number of bits of the generated random sequence, and the higher the complexity of the generated random sequence. For example, when F=2, the expected value of N is 5.25, i.e., the expected value of the number of bits of the generated random sequence is 5.25. The number of bits of the random sequence that are output by four state machines according to the related art is 4. As shown in Table 1, when F=4, the corresponding expected value is less than 4. In addition, F takes the other value, the corresponding expected value is greater than 4, and the average expected value is 5.28125, which is greater than 4. As shown in FIGS. 5 to 10, when the other parameters are the same, the probability density distributions of N under different values of F are also different, and a large difference is present in the probability density distributions. Therefore, it is difficult to infer the generated random sequence even in the case that a part of the parameters are acquired. Accordingly, the method generating random sequences according to the embodiments of the present disclosure may effectively increase the length of the random sequence and the unpredictability.

Second Example

The parameter settings are as follows:

A(0)=0, K=32, r=0.5, i.e., an indicator value of the first state machine is 0, and 32 state machines are employed to output values. When the boundary condition is satisfied, N takes the corresponding value, i.e., the state machine currently outputting the value is the $(N+1)^{th}$ state machine, and the length of the generated random sequence is N+1.

FIGS. 11 to 16 are schematic diagrams of probability density distributions of N under different values of F of another example according to an embodiment of the present disclosure. As shown in FIGS. 11 to 16, the probability distributions of N under different values of F have a greater randomness, whereby the number of bits of the generated random sequence also has a greater randomness. Even in the case that initially set parameters are acquired, it is difficult to infer the generated random sequence, which improves the security of information encryption using the random sequence.

Figure 17:
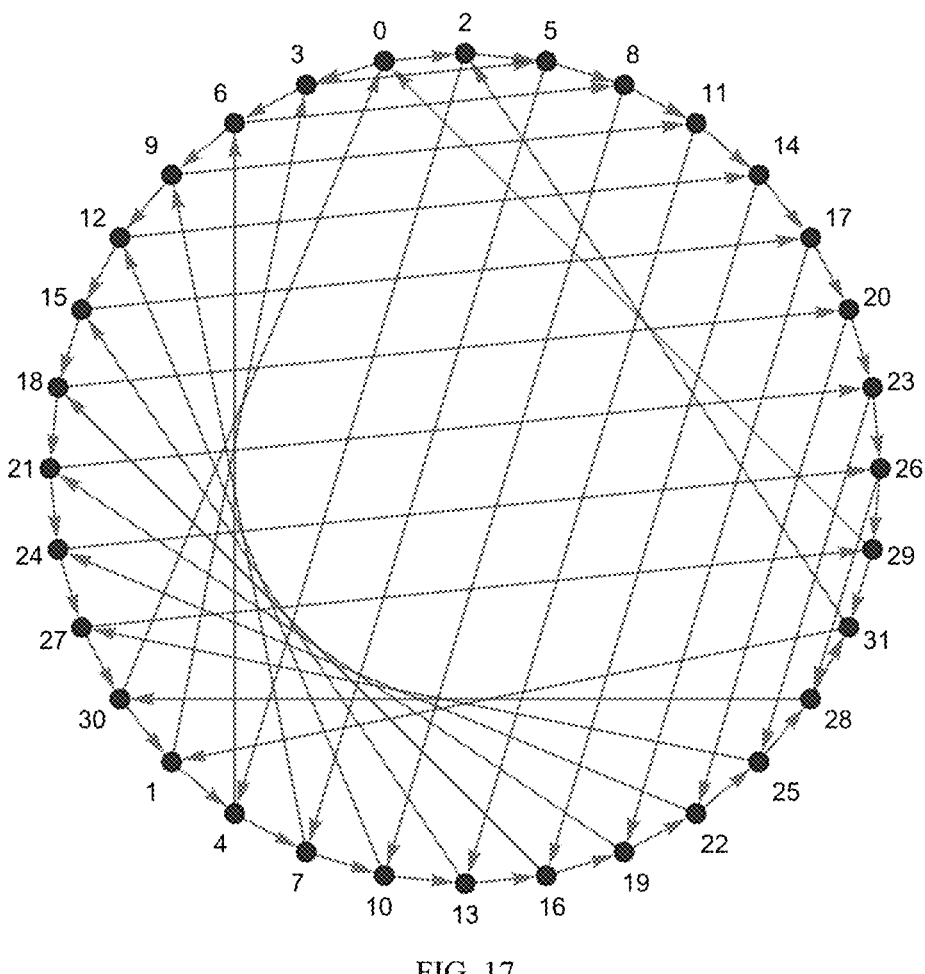
FIG. 17 is a schematic diagram of a transition procedure of state machines of another example according to an embodiment of the present disclosure.

FIG. 17 is a schematic diagram of a transition procedure of state machines of another example according to an embodiment of the present disclosure. As shown in FIG. 17, each vertex corresponds to a state machine. Setting specific parameters as A(0)=0, K=32, r=0.5, F=2, the probability of transition from vertex A to vertex A+F or to vertex A+F+1 is 0.5. For example, vertex 0 corresponds to the first state machine, the probability of transition from vertex 0 to vertex 2 or to vertex 3 is 0.5. That is, the probability that the second state machine is the state machine 2 or the state machine 3 is 0.5 when the first state machine is the state machine 0.

Figure 18:
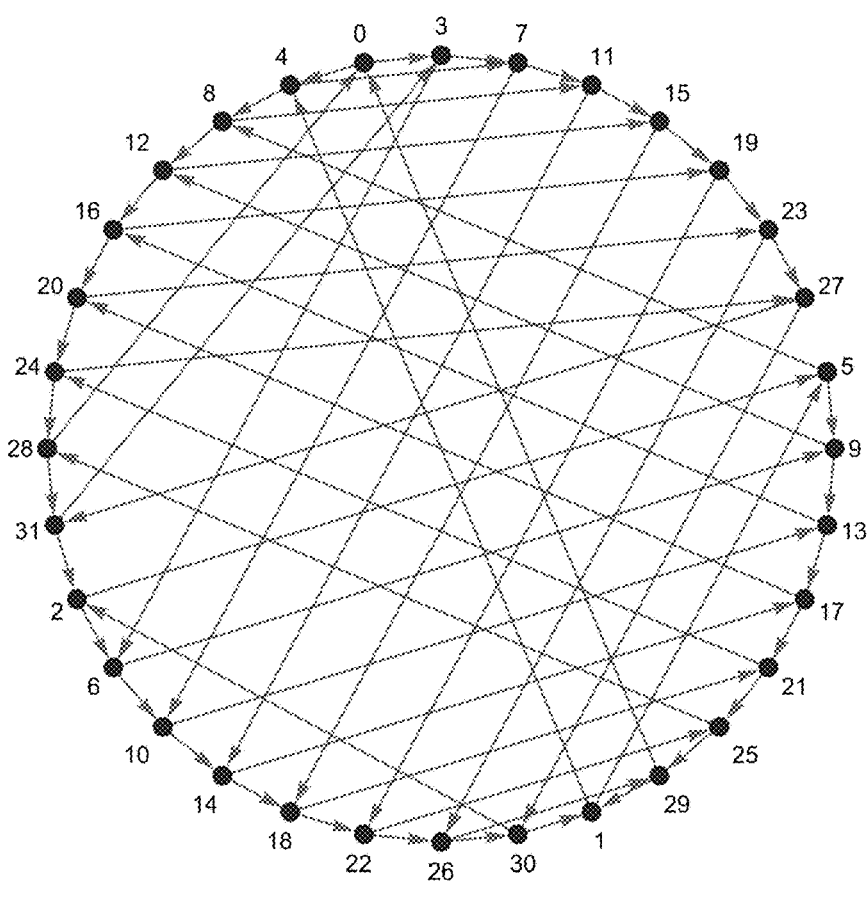
FIG. 18 is a schematic diagram of a transition procedure of state machines of another example according to an embodiment of the present disclosure.

FIG. 18 is a schematic view of a transition procedure of state machines of another example according to an embodiment of the present disclosure. As shown in FIG. 18, setting specific parameters as A(0)=0, K=32, r=0.5, F=3, the probability of transition from vertex A vertex A+F or to vertex A+F+1 is 0.5. For example, vertex 0 corresponds to the first state machine. The probability of transition from vertex 0 to vertex 3 or to vertex 4 is 0.5. That is, the probability that the second state machine is the state machine 3 or the state machine 4 is 0.5 when the first state machine is the state machine 0.

Third Example

The parameter settings are as follows:

A(0)=0, K=32, F=2, i.e., an indicator value of the first state machine is 0, and 32 state machine are employed to output values. Equation (4) is a boundary condition. When the boundary condition is satisfied, N takes the corresponding value, i.e., the state machine currently outputting the value is the $(N+1)^{th}$ state machine.

Figure 19:
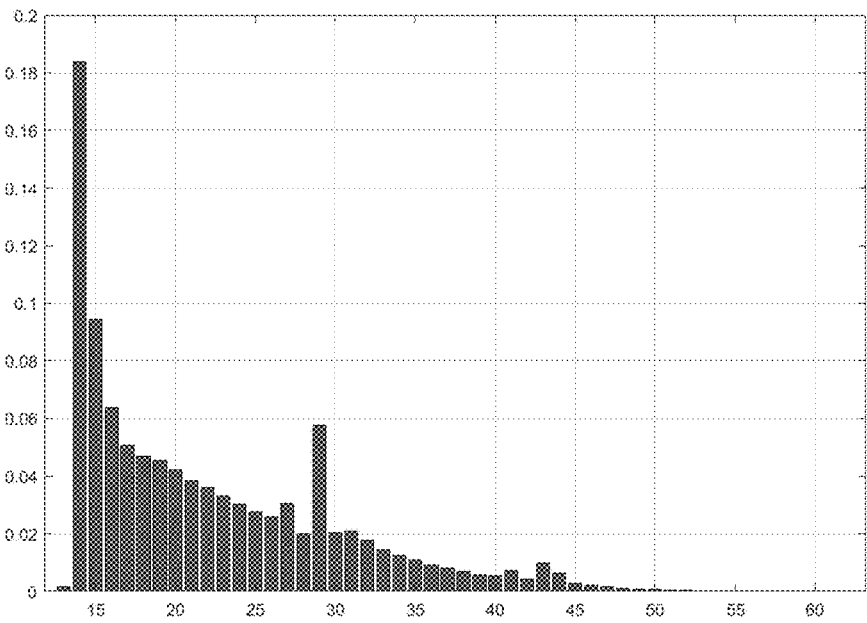
FIGS. 19 and 20 are diagrams of probability density distributions of N under different values of r of another example according to an embodiment of the present disclosure.
Figure 20:
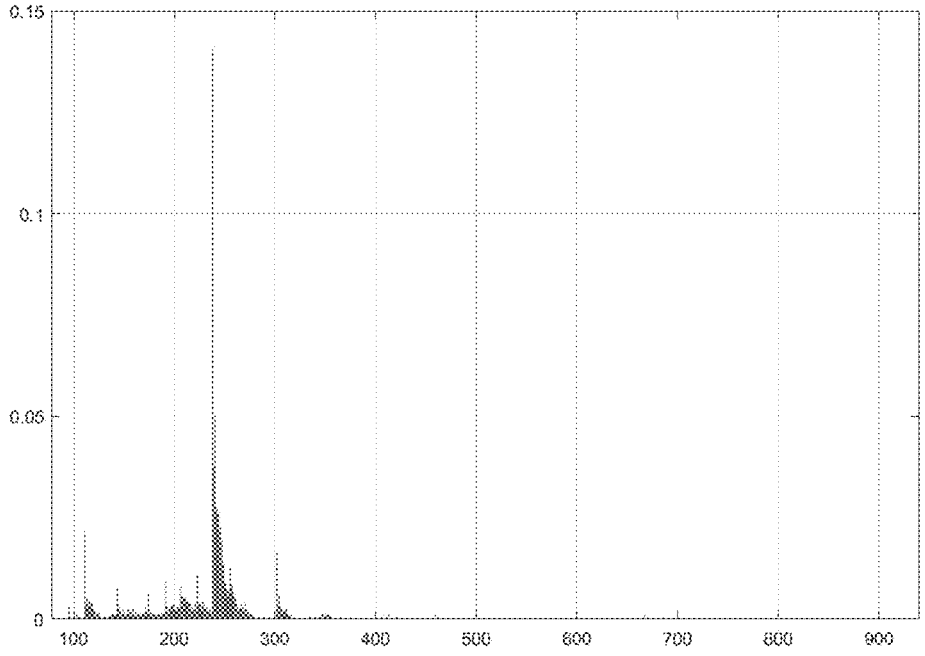

FIGS. 19 and 20 are diagrams of probability density distributions of N under different values of r of another example according to an embodiment of the present disclosure. As shown in FIGS. 19 and 20, where the initial parameters other than r are the same, different values are set for r, the resulting probability density distributions of N are also different, and the resulting random sequences are not identical. By setting different values for r, the randomness and difficulty of the random sequence can be further increased.

Figure 21:
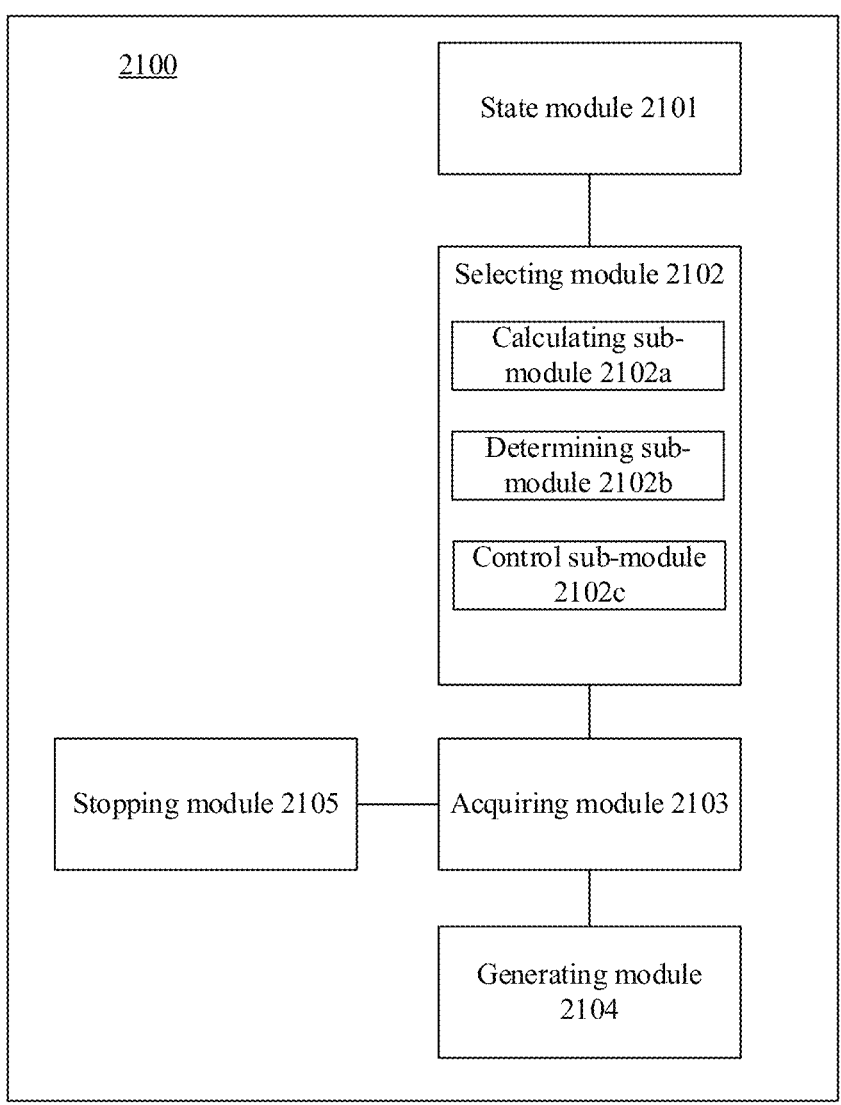
FIG. 21 is a schematic diagram of an apparatus for generating random sequences according to an embodiment of the present disclosure.

FIG. 21 is a schematic diagram of an apparatus for generating random sequences according to an embodiment of the present disclosure. As shown in FIG. 21, the apparatus includes a state module 2101, a selecting module 2102, an acquiring module 2103, and a generating module 2104. The state module 2101 includes a plurality of state machines, wherein any of the state machines is configured to generate an output. The selecting module 2102 is configured to select, in accordance with the first rule, a state machine from the state machines successively to output a value according to history output values of at least a portion of the state machines. The acquiring module 2103 is configured to acquire an output value of each of the state machines. The generating module 2104 is configured to form a random sequence from the output values of the state machines according to an output order of the state machines.

In one possible implementation of the embodiments of the present disclosure, a serial number is assigned to each of the state machines, and the serial numbers of the state machines are integer and consecutive numbers. The selecting module 2102 includes a calculating sub-module 2102a, a determining sub-module 2102b, and a control sub-module 2102c. The calculating sub-module 2102a is configured to calculate an indicator value of a second state machine according to an indicator value of the first state machine, an output value of the first state machine, and the second state machine is a next one of the state machines which outputs a value following the first state machine A determining sub-module 2102b is configured to determine a number of the second state machine based on the indicator value of the second state machine. The control sub-module 2102c is configured to control the second state machine to output the value according to the serial number of the second state machine.

In one possible implementation of the embodiments of the present disclosure, the calculating sub-module 2102a is configured to acquire the indicator value of the second state machine by performing a Mod K operation on a sum of the indicator value of the first state machine, the product of the output value of the first state machine and a first parameter value, and a second parameter value. K represents a quantity of the state machines, the first parameter value is greater than 0 and less than 1, the second parameter value is an integer, and the second parameter value ranges within [2, 2K−1].

In one possible implementation of the embodiments of the present disclosure, the determining sub-module 2102b is configured to assign an integer portion of the indicator value of the second state machine as the serial number of the second state machine.

In one possible implementation of the embodiments of the present disclosure, the apparatus further includes a stopping module 2105, which is configured to control the state machines to stop outputting values when a boundary condition is satisfied. The boundary condition includes: one history indicator value in a set of the history indicator values being equal to an indicator value of the state machine currently outputting the value.

In one possible implementation of the embodiments of the present disclosure, the serial number of the state machines is $2^t$, wherein t is a positive integer.

In one possible implementation of the embodiments of the present disclosure, each of the state machines randomly selects one of a first value and a second value as the output value to output the value at a first output value.

It should be noted that the apparatus for generating random sequences according to the aforementioned embodiments, in the random sequence generation, is only illustrated through a division of the functional modules described above. In a practical application, the above functions may be assigned to different functional modules as required. That is, in terms of internal structure, the device is divided into different functional modules to implement all or part of the functions described above. In addition, the embodiments of the apparatus for generating random sequences and the method for generating random sequences described above are based on the same concept, and the implementation of the process is detailed in the embodiments of the method, which is not repeated herein.

Figure 22:
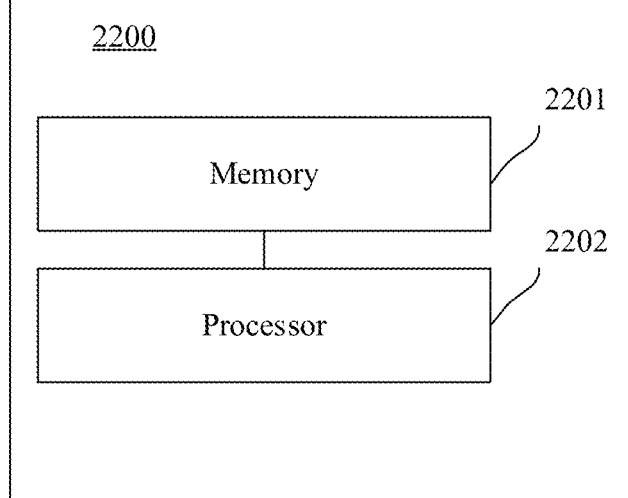
FIG. 22 is a schematic structural diagram of a computer device according to an embodiment of the present disclosure.

FIG. 22 is a schematic structural diagram of a computer device according to an embodiment of the present disclosure. As shown in FIG. 22, the computer device includes a memory 2201 and a processor 2202, and those skilled in the art will appreciate that the structure of the computer device 2200 shown in FIG. 22 does not constitute a limitation of a computer device 2200. The computer device 2200 may include more or less components than those illustrated, or combine some components, or different arrangements of components.

The memory 2201 may be configured to store computer programs and modules. The memory 2201 may primarily include a program store and a data store, where the program store may store an operating system, at least one application for implementing at least one function, and the like. The memory 2201 may include a high-speed random access memory, and may also include a non-volatile memory, such as at least one magnetic disk storage device, flash memory device, or other volatile solid state storage devices. Accordingly, the memory 2201 may also include a memory controller to provide access to the memory 2201 by the processor 2202.

The processor 2202 executes various functional applications and data processing, such as the methods according to the embodiments of the present disclosure, by running software programs and modules stored in the memory 2201.

An exemplary embodiment of the present disclosure further provides a computer device. The computer device includes a processor, and a memory configured to store computer programs. The processor, when loading and running the computer programs, is caused to perform the method according to the embodiments of the present disclosure.

An exemplary embodiment of the present disclosure further provides a computer-readable storage medium. The computer-readable storage medium is a non-transitory storage medium, and stores computer programs therein. The computer programs, when loaded and run by a processor, cause the processor to perform the method according to the embodiments of the present disclosure.

An exemplary embodiment of the present disclosure further provides a computer program product. The computer program product stores computer instructions therein. The computer instructions, when loaded and executed by a computer, cause the computer to perform the method according to the embodiments of the present disclosure.

A person of ordinary skill in the art will appreciate that all or part of the steps to implement the embodiments described above may be accomplished by hardware, which may also be implemented by program instructions. The program may be stored in a computer-readable storage medium, which may be a read-only memory, a magnetic or optical disk, or the like.

Described above are merely exemplary embodiments of the present disclosure and are not intended to limit the present disclosure. Any modifications, equivalent substitutions, improvements, and the like are within the protection scope of the present disclosure, without departing from the spirit and principles of the present disclosure.

What is claimed is:

1. A method for generating random sequences, applicable to generate a random sequences using a plurality of state machines, wherein any state machine of the state machines is configured to generate an output value;

the method comprising:

selecting, in accordance with a first rule, a state machine from the state machines successively to output an output value according to history output values of at least a portion of the state machines;

acquiring the output value of each of the state machines; and forming a random sequence from the output values of the state machines according to an output order of the state machines; and wherein a serial number is assigned to each of the state machines, the serial numbers of the state machines being integer and continuous values;

the first rule is configured to calculate an indicator value of a second state machine according to an indicator value of a first state machine and an output value of the first state machine, the second state machine being a next one of the state machines which outputs a value following the first state machine; and selecting, in accordance with the first rule, the state machine from the state machines successively to output the output value according to the history output values of the at least a portion of the state machines comprises:

calculating the indicator value of the second state machine using the first rule based on the indicator value of the first state machine and the output value of the first state machine;

determining a serial number of the second state machine based on the indicator value of the second state machine; and controlling the second state machine to output the output value according to the serial number of the second state machine.

2. The method according to claim 1, wherein calculating the indicator value of the second state machine using the first rule based on the indicator value of the first state machine and the output value of the first state machine comprises:

acquiring the indicator value of the second state machine by performing a Mod K operation on a sum of three portions, wherein the three portions comprise the indicator value of the first state machine, a product of the output value of the first state machine and a first parameter value, and a second parameter value;

wherein K represents a quantity of the state machines, the first parameter value is greater than 0 and less than 1, the second parameter value is an integer, and the second parameter value ranges within $[2, 2K-1]$.

3. The method according to claim 2, wherein determining the serial number of the second state machine based on the indicator value of the second state machine comprises:

assigning an integer portion of the indicator value of the second state machine as the serial number of the second state machine.

4. The method according to claim 1, further comprising:

controlling the state machines to stop outputting values when a boundary condition is satisfied;

wherein the boundary condition comprises: one history indicator value in a set of the history indicator values being equal to an indicator value of the state machine currently outputting the value.

5. The method according to claim 4, wherein the quantity of the state machines is $2^t$, wherein t is a positive integer.

6. The method according to claim 1, wherein a first value or a second value is selected as the output value to output the value at a first output.

7. A computer device for generating random sequences, comprising a processor and a memory; wherein the memory is configured to store computer programs; and the processor is configured to perform, when executing the computer programs stored in the memory, the method as defined in claim 1.

8. A non-transitory computer-readable storage medium storing computer instructions therein, wherein the computer instructions, when executed by a processor, cause the processor to perform the method as defined in claim 1.

9. The computer device for generating random sequences according to claim 7, wherein calculating the indicator value of the second state machine using the first rule based on the indicator value of the first state machine and the output value of the first state machine comprises:

acquiring the indicator value of the second state machine by performing a Mod K operation on a sum of three portions, wherein the three portions comprise the indicator value of the first state machine, a product of the output value of the first state machine and a first parameter value, and a second parameter value;

wherein K represents a quantity of the state machines, the first parameter value is greater than 0 and less than 1, the second parameter value is an integer, and the second parameter value ranges within [2, 2K−1].

10. The computer device for generating random sequences according to claim 9, wherein determining the serial number of the second state machine based on the indicator value of the second state machine comprises:

assigning an integer portion of the indicator value of the second state machine as the serial number of the second state machine.

11. The computer device for generating random sequences according to claim 7, further comprising:

controlling the state machines to stop outputting values when a boundary condition is satisfied;

wherein the boundary condition comprises: one history indicator value in a set of the history indicator values being equal to an indicator value of the state machine currently outputting the value.

12. The computer device for generating random sequences according to claim 11, wherein the quantity of the state machines is $2^t$, wherein t is a positive integer.

13. The computer device for generating random sequences according to claim 7, wherein a first value or a second value is selected as the output value to output the value at a first output.

14. The non-transitory computer-readable storage medium according to claim 8, wherein calculating the indicator value of the second state machine using the first rule based on the indicator value of the first state machine and the output value of the first state machine comprises:

acquiring the indicator value of the second state machine by performing a Mod K operation on a sum of three portions, wherein the three portions comprise the indicator value of the first state machine, a product of the output value of the first state machine and a first parameter value, and a second parameter value;

wherein K represents a quantity of the state machines, the first parameter value is greater than 0 and less than 1, the second parameter value is an integer, and the second parameter value ranges within [2, 2K−1].

15. The non-transitory computer-readable storage medium according to claim 14, wherein determining the serial number of the second state machine based on the indicator value of the second state machine comprises:

assigning an integer portion of the indicator value of the second state machine as the serial number of the second state machine.

16. The non-transitory computer-readable storage medium according to claim 8, further comprising:

controlling the state machines to stop outputting values when a boundary condition is satisfied;

wherein the boundary condition comprises: one history indicator value in a set of the history indicator values being equal to an indicator value of the state machine currently outputting the value.

17. The non-transitory computer-readable storage medium according to claim 16, wherein the quantity of the state machines is $2^t$, wherein t is a positive integer.

* * * * *